Patented Nov. 1, 1949

2,486,774

UNITED STATES PATENT OFFICE 2,486,774

PROCESS FOR THE PREPARATION OF PENTAERYTHRITOL

Joseph A. Wyler, Allentown, Pa., assignor to Trojan Powder Company, a corporation of New York No Drawing. Application March 1, 1946, Serial No. 651,385

3 Claims. (Cl. 260—635)

This invention relates to the preparation of pentaerythritol, particularly to a process for the preparation of pentaerythritol by the condensation of acetaldehyde with formaldehyde of special kind in alkaline medium.

This application is a continuation in part of my application Serial No. 569,656 filed by me on December 22, 1944, now abandoned, and entitled Process for the preparation of pentaerythritol.

The principal object of my invention is to provide an improved process for the preparation of pentaerythritol. A more specific object is to provide an extremely rapid process for this purpose. Other and further objects will become apparent upon a perusal of this specification and claims.

It has been known for more than forty-five years that formaldehyde and acetaldehyde react in the presence of an alkali to form pentaerythritol, and this knowledge has led to the development of numerous processes for the preparation of this product. However, all known processes require a period of from say ten hours to several days or even to several months for the reaction to properly complete itself if the temperature of the reaction is held at 30° C. or less. In those processes in which the temperature of the reaction is allowed to exceed 30° C. the time of the reaction is shortened considerably, but certain side reactions take place which are undesirable.

I have discovered that aqueous solutions of formaldehyde of the same percentage composition are not identical from the standpoint of chemical reactivity in making pentaerythritol. Some of these solutions react much more rapidly than others, under identical conditions. The cause of these differences in reactivity is considered to be due to changes accompanying the distillation of the formaldehyde from aqueous solution before use, not to difference in chemical composition or purity, but to variation in physical relationship such as variations in the rotational structure (see Chemical Abstracts 28, 3305, article by Dieke and Kistiakowsky), including the valence electrons and possibly the electron angle. Whatever the reason, I have discovered that, when formaldehyde and acetaldehyde are caused to react upon each other in aqueous alkaline media, very significant differences in reaction rates are obtained under what appear to be identical conditions. With some formaldehydes it is not possible to satisfactorily complete the reaction, at 30° C., over a time interval of as much as a week, whereas with other formaldehydes the reaction completes itself within a few hours or even less.

I have discovered that if there is used, in the reaction mentioned above, a formaldehyde which has a specific type of light transmission, the reaction uniformly completes itself within a matter of minutes or of a few hours. More specifically, I have discovered that, when a form of formaldehyde that in a 30% (by weight) aqueous solution has a specific light transmission at 25° C. of more than 79% for light of 320 millimicron wave length is used in the reaction, a considerably greater speed of reaction is obtained along with an improvement in the yield of pentaerythritol. Particularly quick and effective condensation is obtained when the formaldehyde used has a transmission of 80–85% or more for 320 millimicron light. When, on the other hand, the transmission mentioned above is as low as 69%, the formaldehyde is of poor reactivity for the condensation and not dependable in this reaction.

It is known that formaldehyde in the presence of water undergoes hydration to dihydroxymethane, $CH_2(OH)_2$, and that the percentage of the formaldehyde so hydrated increases with the proportion of water to formaldehyde. At low temperatures and in dilute solutions the proportion of the total formaldehyde so hydrated may reach about 90% or more.

In making the special formaldehyde of low specific transmission for light of the wave length 320 millimicrons (3.200 Angstrom units), the formaldehyde is distilled from a dilute aqueous solution previous to use in the condensation with acetaldehyde to make pentaerythritol. Preferably the distillation is from an aqueous solution of about 30% concentration of actual formaldehyde and the distillate is used at least reasonably promptly.

In the method of making this special alcohol of the desired low transmission for light of stated wave length, the middle cut of the distillation is used, a foreshot of say 10% by weight being rejected and the last 30% or 40% or so being left as a residue in the still. The foreshot and residue of 30 to 40% may be combined and reworked by the distillation process or used for other chemical purposes in which the special kind of formaldehyde is not a factor in the rate of reaction or the yield.

The weaker the solution of formaldehyde subjected to this distillation, the greater the proportion of the formaldehyde distilled that passes the test for specific transmission of 79% or more for the light of 320 millimicrons wave length.

In order to more clearly point out my invention, the following examples are given in which all parts are expressed by weight.

Example 1

906 parts of water were placed in a suitable vessel provided with a stirrer and a jacket for regulating the temperature of the reaction mixture. Then 409.6 parts of 29.3% $CH_2O$ in water were added and the mixture stirred. This mixture therefore contained 1196 gms. of water and 120 gms. of $CH_2O$.

The formaldehyde used when tested in the form of a 30% formaldehdye in water solution, had a specific transmission at 25° C. of 81% for 320 millimicron light when using the standard Beckmann spectrophotometer and the 1 cm. quartz cells.

To this mixture, 44 parts of 99.5% acetaldehyde were added in a steady stream over a period of two hours while simultaneously adding a lime slurry consisting of 58 parts of hydrated lime and 150 parts of water over a period of 1½ hours. The temperature of the reaction mixture was kept at about 30° C. throughout the reaction.

Seven hours after the acetaldehyde had been added an iodine titration indicated that the mixture contained only 0.24% of formaldehyde and the yield of pentaerythritol was over 88% of theory.

In a comparative experiment using an unsatisfactory formaldehyde of a transmission of 69% for 320 millimicron light was used, the reaction was completed to the level of 0.26% of formaldehyde only after 23 hours and the yield was 85.5%.

Example 2

In a similar experiment, except that the formaldehyde used had a specific transmission of 85% for 320 millimicron light, the reaction was completed in about 4 hours to an endpoint of .25% $CH_2O$ and the yield was over 88% of theory.

Although in the examples, a temperature of reaction of 30° C. is given, I do not confine myself to this specific temperature. I may use temperatures as high as 50° C. in which case the acetaldehyde is added more rapidly than mentioned in the example given above or I may use temperatures as low as 5° C. in which case the rate of addition of the acetaldehyde is usually slowed down. When temperatures as high as 45° to 50° C. are used for the reaction, this highly reactive formaldehyde not only performs the function of completing the condensation in less than one hour but also serves to prevent the formation of colored syrups which cause difficulties in subsequent purification operations.

Also, in the examples, the acetaldehyde is added to the formaldehyde, but this is not absolutely necessary. It is, however, the preferred method. The aldehydes may be mixed previous to the addition of alkali or they may both be added simultaneously. If they are mixed together before adding the alkali there is a tendency to produce more dipentaerythritol, as an impurity in the pentaerythritol, than when the condensations are run in accordance with the examples given.

The preferred proportion of formaldehyde to acetaldehyde is four molecules of $CH_2O$ to one molecule of $CH_3CHO$ but other proportions as from 3 to 1 to 4.5 to 1 may be used.

The alkali used may be any water-soluble, fixed alkali such as $Ca(OH)_2$, $Ba(OH)_2$, NaOH, KOH, mixtures of these, etc.; and the proportions used and the manner of addition of the alkali may be varied considerably provided there is always an excess of alkali present throughout the condensation.

The concentrations of reactants may also be varied over a wide range, but in general the preferred concentration of aldehydes is such as to contain at least 3% $CH_2O$ but not to exceed 20% $CH_2O$ at the beginning of the condensation.

For purposes of this invention the term "formaldehyde" is intended to cover the compound $CH_2O$ in either pure or commercial form.

"Specific transmission" means the percentage of the light, of 320 millimicron wave-length, entering an aqueous formaldehyde solution of 30% $CH_2O$ by weight, at 25° C., that passes through a layer of the solution of 1 cm. thickness, all measurements being made with the standard Beckmann spectrophotometer and with the use of quartz cells.

The final reaction mixture contains the pentaerythritol in solution and may be processed in accordance with any of the well known methods now in use for the separation of the pentaerythritol in pure or commercial condition.

It will be understood also that it is intended to cover all changes and modifications of the example of the invention herein chosen for the purpose of illustration which do not constitute departures from the spirit and scope of the invention.

I claim:

1. In making pentaerythritol the method which comprises distilling formaldehyde from an aqueous solution thereof, this distillation giving a distilled formaldehyde of high specific transmission for light of wave length 320 millimicrons, forming a mixture of the distilled formaldehyde, at a time when the specific transmission for light of the said wave length is not less than 79%, with acetaldehyde and an aqueous solution of a fixed alkali and maintaining the resulting mixture at a temperature not above 50° C. until the reaction between the formaldehyde and acetaldehyde to give pentaerythritol is substantially complete.

2. The method described in claim 1, the alkali used being calcium hydroxide.

3. The method described in claim 1, the proportions of the two aldehydes being 44 parts by weight of acetaldehyde to about 120 parts of actual formaldehyde, about 1196 parts of water and 58 parts of calcium hydroxide, and the temperature at which the mixture is maintained being about 30° C.

JOSEPH A. WYLER.

REFERENCES CITED

The following references are of record in the file of this patent:

UNITED STATES PATENTS

| Number | Name | Date |
| --- | --- | --- |
| 2,004,010 | Nanjoks | June 4, 1935 |
| 2,381,855 | Spence et al. | Aug. 7, 1945 |

OTHER REFERENCES

Gilman, "Organic Syntheses," Collective vol. 1 2nd ed.), pp. 425-427.